Nov. 15, 1932.    M. B. WILLIAMS    1,888,021
TRACTOR OR AUTOMOTIVE VEHICLE AUTOMATIC GUIDE
Filed Oct. 23, 1930    3 Sheets-Sheet 1
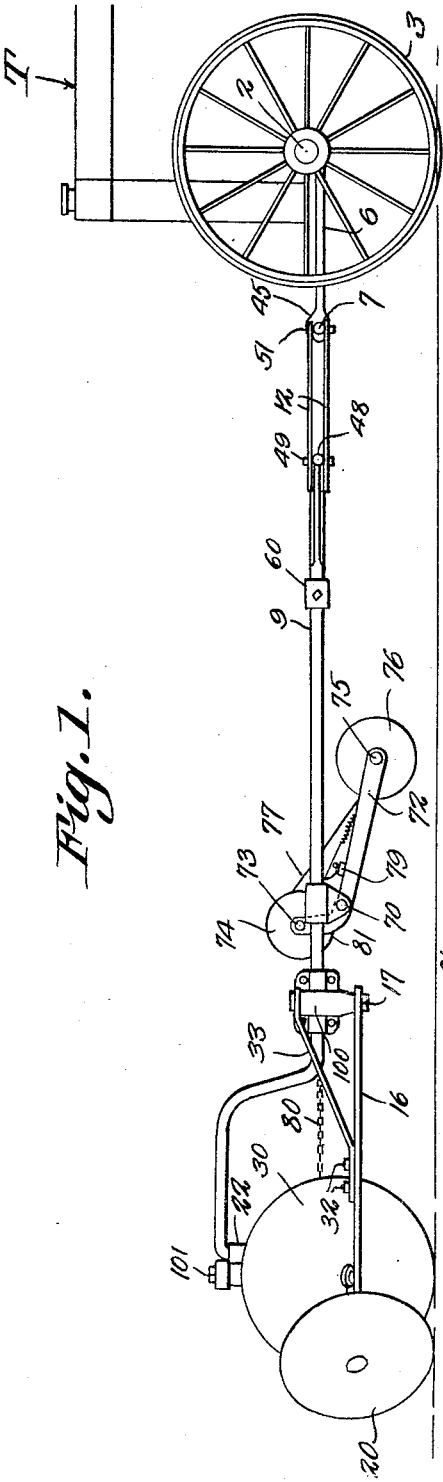
Inventor
Mark B. Williams
By C.A.Snow&Co.
Attorneys.

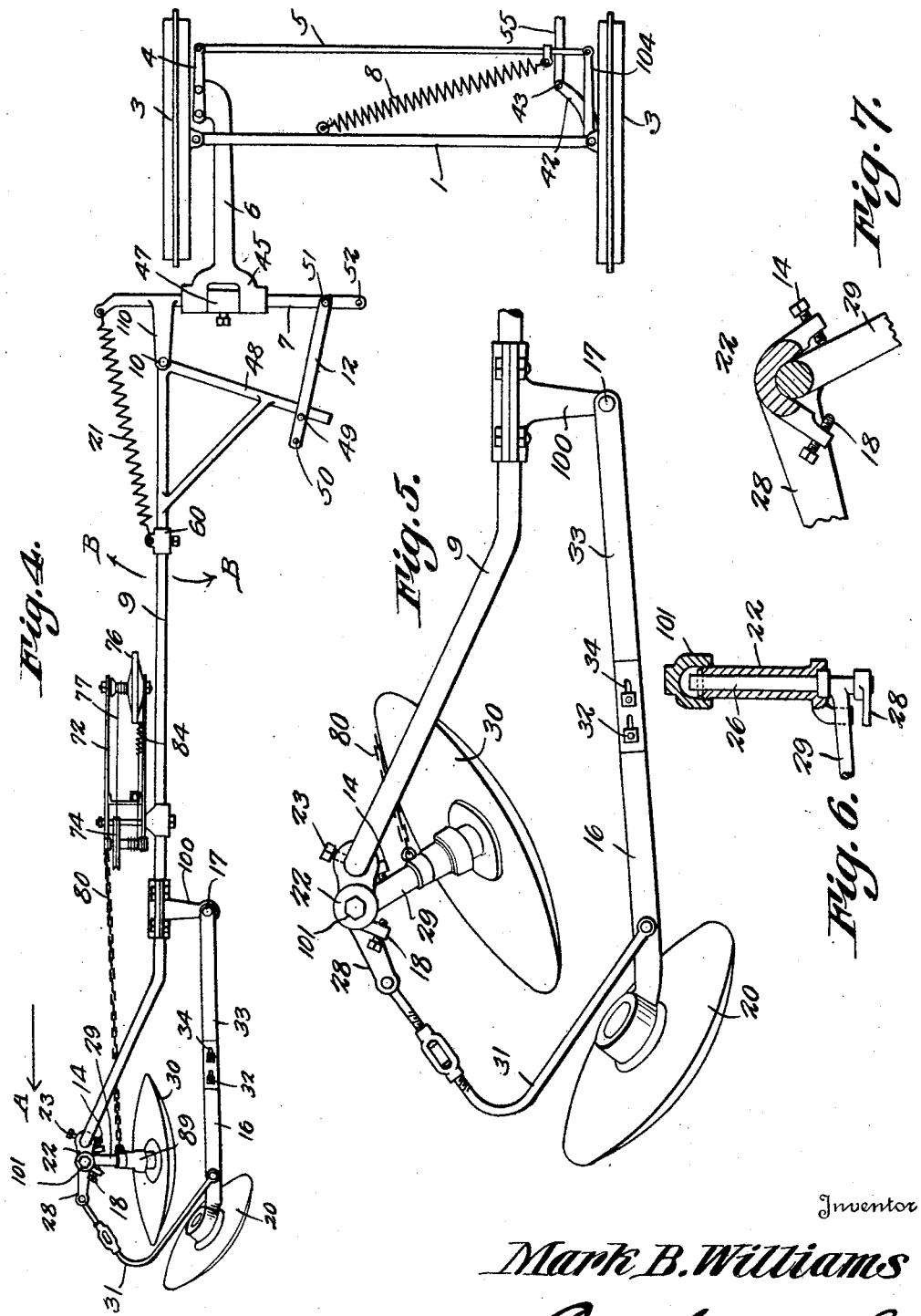

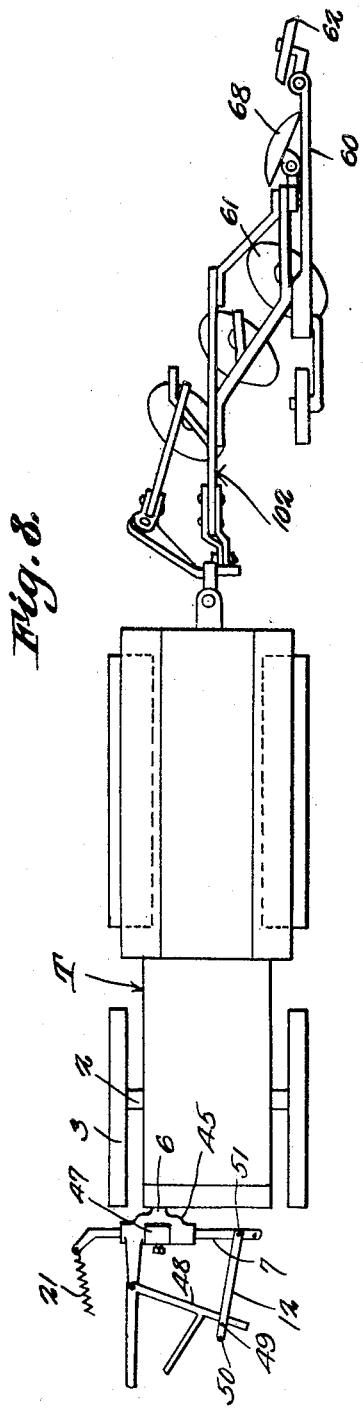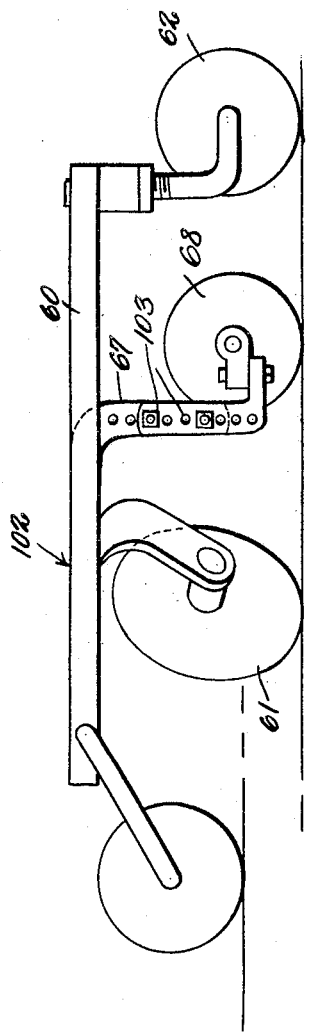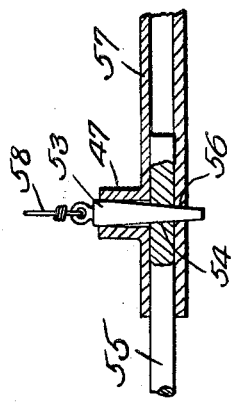

Patented Nov. 15, 1932

1,888,021

UNITED STATES PATENT OFFICE

MARK B. WILLIAMS, OF PLAINVIEW, TEXAS

TRACTOR OR AUTOMOTIVE VEHICLE AUTOMATIC GUIDE

Application filed October 23, 1930. Serial No. 490,802.

This invention relates to an automatic control for a steering mechanism, the invention being adapted to be applied to tractors or other automotive machines which are used for drawing furrow-making or trench-making implements, and, broadly speaking, one object of the present invention is to provide a mechanism which may be employed in connection with a tractor, the device forming the subject matter of this application being propelled by the tractor and serving to guide the tractor in parallel relation to a furrow or trench that has been formed previously.

So far as I am advised as to the state of the art, no tractor guide heretofore invented will cause the tractor to turn, at the corner of plowed land, upon a curve of as short radius, or upon an angle so pronounced, as can be turned if the tractor were guided by the usual mechanism under the control of the operator; and another object of the invention is to remedy the difficulty last-above mentioned.

Another object of the invention is to provide means whereby, should the furrow-following assembly leave the furrow, the ignition system of the internal combustion engine which propels the tractor will be short-circuited, the tractor being stopped, and breakage of parts being avoided.

Another object of the invention is to provide means whereby a tractor which is automatically guided, may be capable of plowing fields, which are unusually rough, or fields which may have been plowed previously in a very uneven manner.

A further object of the invention is to provide novel means whereby a change can be made quickly from an automatic steering control for the tractor to a control under the governance of an operator, and vice versa.

A further object of the invention is to provide means whereby the tractor will be turned with uniform curvature at the corners of a plowed patch, thereby keeping the incompletely plowed portions of the land, at the corners of the patch, of a uniform width, so that a minimum amount of plowing-out at the corners of the patch will be required.

Another object of the invention is to provide means for relieving the mechanism of the tractor guide from excessive shocks, which might cause damage.

The invention aims to supply a means for holding the tractor at the desired distance from the guiding furrow, thereby enabling the tractor to operate in connection with different kinds of work.

It is within the province of the disclosure to improve generally, and to enhance the utility of, devices of that type to which the present invention appertains.

With the above and other objects in view, which will appear as the description proceeds, the invention resides in the combination and arrangement of parts and in the details of construction hereinafter described and claimed, it being understood that changes may be made in the precise embodiment of the invention herein disclosed, within the scope of what is claimed, without departing from the spirit of the invention.

In the accompanying drawings:

Figure 1 shows in side elevation, a device constructed in accordance with the invention;

Figure 2 is a plan of the circuit opener;

Figure 3 is a vertical section of the circuit opener;

Figure 4 is a plan, the furrow-following assembly being in closed position;

Figure 5 is a plan showing the furrow-following assembly in open position, parts being broken away;

Figure 6 is a vertical section disclosing one of the bearings and attendant parts;

Figure 7 is a cross section of the structure depicted in Figure 6;

Figure 8 is a top plan wherein parts are broken away;

Figure 9 is an elevation showing the soil-engaging means which is attached to the rear end of the tractor;

Figure 10 is a sectional view showing a connection in the steering mechanism.

In the following description, it will be presupposed that the observer is facing the front of the mechanism, that is, in the direction of the arrow A in Figure 4, the terms "right" and "left" being selected accordingly.

The letter T marks a tractor, and the numeral 1 designates the front axle of the tractor, the ground wheels 3 being journaled on the movable axle ends 2, the axle ends 2 having arms 4 and 104, to which a drag link 5 is pivoted. A strong retractile spring 8 is connected to the tractor axle 1 and to the drag link 5. The arm 104 may have an inward extension 42 to which is pivoted at 43, the forward member or rod 55 of a steering connection, the steering connection comprising a sleeve 57 in which the rod 55 can reciprocate, the sleeve 57 being operatively connected, in the usual way, with the steering wheel (not shown) of the tractor T. The sleeve 57 has an upstanding tubular guide 47 in which a latch pin 53 is carried slidably, and the latch pin 53 is adapted to be engaged in a seat 54 in the rod 55, and in a seat 56 in the sleeve 57. The latch pin 53 can be lifted clear of the seats 56 and 54 so that the rod 55 can reciprocate freely in the sleeve 57. This is the position of the parts whilst the tractor guide (hereinafter described) is operating. For the present, the function of the latch pin 53, as a means for coupling the rod 55 to the sleeve 57 may be disregarded. The latch pin 53 is raised by a flexible element 58.

A bearing 6 is rigidly attached to the arm 4, and extends forwardly therefrom. The bearing 6 has a fork 45 in which a shaft 7 is mounted for rocking movement. A set collar 47 on the shaft 7 co-operates with the fork 45, and prevents the shaft 7 from moving endwise. In one end of the shaft 7 there is a hole 52. A securing element 51 holds a forwardly extended hobble 12 on the shaft 7. A stop pin 49 is mounted on the hobble 12. The hobble 12 has an additional hole 50 to receive the stop pin 49 under the circumstances which will be pointed out hereinafter.

The numeral 9 marks a main frame including a lateral extension 48 received slidably in the hobble 12. The main frame 9 is pivoted at 10 to an arm 110 on the shaft 7, to swing in a direction indicated by the arrows B in Figure 4, but not to swing vertically with respect to the shaft 7, vertical swinging movement of the frame 9, nevertheless, being possible because the shaft 7 can rock in the fork 45 of the bearing 6. The rear end of a retractile spring 21 is connected to the end of the shaft 7, and a set collar 60 connects the forward end of the spring 21, adjustably, with the main frame 9.

An auxiliary frame 16 is pivoted at its rear end, as shown at 17, on an arm 100 on the main frame 9, for swinging movement in the direction of the arrows B of Figure 4. A furrow-engaging member, in the form of a right-tending guide disc 20, is journaled on the auxiliary frame 16.

A tubular bearing 22 is held vertically on the frame 9, through the instrumentality of a set screw 23. The bearing 22 carries adjustable stops 14 and 18. A shaft 26 is arranged vertically in the bearing 22 and can rock therein. The upper end of the shaft 26 is covered by a cap 101 on the bearing 22. The shaft 26 has a forwardly extended crank 28. The shaft 26 is supplied with an inwardly projecting axle 29 on which a left-tending guide-wheel 30 is held for rotation. A set collar 89 is mounted on the axle 29 for holding the guide-wheel 30 in position. The axle 29 has movement between the stops 14 and 18, the stop 14 limiting the counter-clockwise rotation of the shaft 26, and the stop 18 limiting the clockwise rotation of the shaft, each adjustably.

The left-tending guide-wheel 30 and the right-tending guide-disc 20 constitute the major elements of a furrow-following assembly, the operation of which is described at length hereinafter.

A longitudinally adjustable link 31 is pivoted at one end to the auxiliary frame 16 and at its opposite end to the crank 28 on the vertical shaft 26.

Owing to the fact that the main frame 9 is pivotally mounted at 10 on the arm 110 of the shaft 7, the main frame 9 can swing in the hobble 12 within the limits defined by the stop pin 49 in the hobble, the spring 21 yielding accordingly. Although the spring 21 is strong enough to hold the frame 9 normally in the position of Figure 4, with the lateral extension 48 in engagement with the stop pin 49, the spring 21, nevertheless, can yield under abnormal conditions, thereby to prevent abnormal stresses in the furrow-following assembly 30—20, such as might occur, for instance, when the furrow-following assembly receives a sudden urge to the left. The spring 21 also prevents the furrow-following assembly 30—20 from being ejected from the furrow at such times.

The normal position of the guide wheel 30 is approximately parallel to the furrow, save when a sharp curve in the furrow is encountered. The tendency of the guide wheel 30, if uncontrolled, is to swing to the left, that is, toward the position of Figure 5, because the wheel 30 is journaled on the leftwardly projecting axle 29. It is on this account that the wheel 30 is denominated a left-tending guide wheel. This tendency of the wheel 30 to swing to the left, into the position of Figure 5, is counteracted by the tendency of the disc 20, when in engagement with the left bank of the furrow, to move toward the right, and the furrow-following assembly 30—20 normally keeps the position of Figure 4 and follows the course of the furrow. Because of this tendency of the disc 20, it is called a right-tending guide disc.

The furrow-following assembly 30—20 operates normally (except when turning a sharp furrow curve) in the closed position of Figure 4. Under such conditions, the left-tending guide wheel 30 runs in intermittent contact with the right bank of the furrow, and the right-tending guide disc 20 runs in intermittent contact with the left bank of the furrow.

The disc 20 is set on the auxiliary frame 16 at such an angle that, when in contact with the earth, it tends to lead toward the right, and thus keep the axle 29 in contact with the stop 18, through the link 31 and the crank 28, which is secured to the shaft 26 and therefore to the axle 29, the furrow-following assembly then being in the closed position of Figure 4. Thus, the closed position of the furrow-following assembly normally is maintained whilst travelling along the course on an approximately straight furrow.

When a sharp curve in the furrow is reached, the resistance of the tractor T against making the curve may be such that the guide wheel 30 sometimes will be forced against the right bank of the furrow, and, in order to relieve the resulting strains on the furrow-following assembly, the shock-absorbing spring 21 is provided, this spring yielding to permit the main frame 9 to move momentarily to the left, normal conditions gradually being regained, and the furrow-following assembly 30—20 being prevented from leaving the furrow.

When a curve to the left in the furrow is reached, the rapidly receding left bank of the furrow causes the disc 20 to loosen its hold in the left bank of the furrow, and the power of control passes to the left-tending guide wheel 30. The left-tending guide wheel 30 moves to the position of Figure 5, and the link 31, together with the crank 28, carry the auxiliary frame 16 and the guide disc 20 into the position of Figure 5, the furrow-following assembly then being in the open position, and the furrow-following assembly tending to move to the left, in conformity to the changing course of the furrow in its curve to the left. As the furrow-following assembly 30—20 approaches the end of the curve in the furrow, the disc 20 progressively obtains a firmer engagement with the left bank of the furrow and re-establishes the right-tending impulse in the disc 20; the frame 16, the link 31 and the crank 28 cooperating to bring the furrow-following assembly back to the closed position of Figure 4, the furrow-following assembly again moving along the substantially straight course of the furrow. Motion is transmitted to the ground wheels 3 of the tractor, for steering, by means of the frame 9, the shaft 7, the bearing 6, the arms 4 and 104, and the drag link 5, assistance being afforded by the spring 8.

It will be noted that, as a sharp curve in the furrow is encountered, the rapidly changing position of the axle 29 gives the guide wheel 30 increased power to bring about a left thrust, and the device thus is enabled to pilot a tractor about an extremely sharp curve, such as may exist at the corner of plowed land.

As is well known to those skilled in the art, one of the chief difficulties met with in the use of tractor guides designed to follow the left curve of a furrow, is that when the guide encounters a left hand balk, or leftwardly bowed place in an insufficiently filled furrow of a previous plowed field, the guide tends to depart leftwardly from the course desired to be followed, and to follow the said left hand balk. This is avoided in the present embodiment of the invention by attaching an arm 67 to the furrow-making implement 102 drawn by the tractor T, adjacent to the rear disc or share 61 of the implement, to which arm is attached a supplementary disc or share 68, for contact with the bottom of said furrow and set to move soil leftwardly against the left bank of said furrow, thus filling in the left-hand balks to such a degree that they will not be of so pronounced a character as to lead the guide astray.

The rear furrow-making member of the furrow-making implement 102 is represented by the disc 61, (Figures 8 and 9), said disc forming the furrow, and leaving the left bank approximately at a level with the adjacent unplowed land. The depth of the furrow is regulated by a vertically adjustable rear implement wheel 62. The auxiliary share or disc 68, designed to eliminate the leftwardly leading balks, is mounted on a bracket 67 carried by the arm 60, and the bracket 67 is adjustable in length, as shown at 103. The disc 68 slightly deepens the furrow, forming a supplementary furrow, soil from which is moved leftwardly against the left bank of the main furrow, thereby creating a heightened left bank, the soil being transferred to the left bank as formed by the disc 61.

When it is desired to shift the guiding mechanism bodily to the right in Figure 4, this can be done by slacking off the set collar 47, shifting the stop pin 49 to the hole 50, and shifting the securing element 51 to the hole 52, the collar being set again to hold the shaft 7 against moving in the direction of its length in the fork 45 of the bearing 6.

In the event that the operator wishes a manual control, the latch pin 53 of Figure 10 is engaged in the seat 54 of the rod 55, and in the seat 56 of the sleeve 57. If, however, automatic control is desired, the latch pin 53 is lifted by means of the flexible element 58, the steering wheel, (not shown) is turned a little, to retract the sleeve 57, and then the rod 55 can reciprocate in the sleeve 57 with the lower end of the latch pin 53 riding on the rear portion of the rod 55. To restore the manual control of the steering mechanism, the operator advances the sleeve 57 a little, by giving the steering wheel (not shown) of the tractor a small turn, and then, as the rod 55 reciprocates, the latch pin 53 will drop into the position of Figure 10.

The auxiliary frame 16 is sustained by a brace 33 connected to the frame 16 by bolts 32 located in slots 34 in the foot of the brace, and it will be observed that the depth of the disc 20, relative to the wheel 30, may be altered by slackening the bolts 32 and moving the foot of the brace 33 slightly along the auxiliary frame 16, and again tightening the bolts. This adjustment is required occasionally, to adapt the furrow-following assembly to different kinds of soils.

The relation of the left-tending element 30 and the right-tending element 20 changes with reference to the course of the furrow, when a left turn in the furrow is met, said change occurring with disproportionate rapidity with respect to the turn of the furrow, and independently of the position of those members of the guide which are connected to the steering mechanism of the tractor, the aforesaid rapid change being brought about by the rapid counter-clockwise movement of the shaft 26, when the disc 20 loses its hold in the left bank of the furrow, thus removing the right-tending force from opposition to the left-tending force.

An electric switch 79 (Figure 3) is mounted in a frame or lever 72, which is mounted on the main frame 9 by means of a horizontal pivot member 70. A vertical extension 81 of the lever 72 carries a shaft 73 whereon is mounted a reel 74, on which is wound a flexible element 77, the flexible element extending rearwardly and being coiled around a spool 82, mounted on a shaft 75, in the lever 72, the shaft carrying a wheel 76, for rotation when in contact with the ground. To the lever 81 is attached a flexible element 80 (Figure 4) extending forwardly and connected to the axle 29, of the shaft 26, the left-tending guide wheel 30 being carried by the part 29.

Whilst the guide is making a leftward turn, at the corner of a field, or when the guide has strayed out of the furrow, the left-tending wheel 30 causes the shaft 26 to rotate, and the axle 29 moves rearwardly relatively to the pivot member 70, as more fully explained hereinafter. This movement permits the flexible element 80 to slacken, allowing the lever 72 to rock backwardly and downwardly and carry the wheel 76 downwardly until it contacts with the earth. Then the wheel 76 begins to rotate on the shaft 75, and rotation is imparted to the spool 82. The flexible element 77 causes the reel 74 and its attached spool 83 to revolve, thereby winding upon the spool 83 a flexible element 105 which extends rearwardly, and is attached by a pull-spring 84 to the lever 72.

Intermediate its ends, the flexible element 105 is attached to the lever 85 of the electric switch 79, by a flexible element 86. As the spool 83 rotates under the impulse of the revolving wheel 76 when in contact with the earth, the flexible element 105 is wound on the spool 83. Eventually the slack is taken out of the flexible element 86, and the switch lever 85 is moved to open position, thus opening the ignition circuit 106 of the tractor T, and the tractor is stopped. Because the flexible element 86 normally hangs slack, an interval of sufficient length is afforded, during which the machine is permitted to complete a normal curve, as found at the corner of a field, before the switch lever 85 is thrown to open position. Hence, the tractor T will not be stopped whilst the guiding mechanism remains in the furrow. How it will be stopped, should it stray from the furrow, will be explained hereinafter. When the tractor has completed a curve, for instance at a corner of a field, the guide will again assume the closed position of Figure 4, as hereinbefore explained, and, as the axle 29 swings forward, it will tighten the flexible element 80, thus raising the lever 72, and elevating the wheel 76 from contact with the earth, through the agency of the upwardly prolonged extension 81 of the lever 72. Then the retractile spring 84 will begin the unwinding of the compound reel system 105—83—74—77—82.

In case the furrow-following assembly should leave the furrow, it is desirable that the motion of the tractor should cease, and this result is obtained in the following manner. If the assembly should leave the furrow to the left, the left-tending guide wheel 30 will be elevated a distance approximately equal to the depth of the furrow, since it normally travels near the bottom of the furrow. This elevation of the wheel 30 causes it to elevate the disc 20, so that the disc 20 is raised above the earth, the disc 20 thus losing its right-tending power, and hence, giving to wheel 30, unopposed control of the assembly 30—20. Thereupon, the wheel 30, being a left-tending wheel, promptly asserts its power, and brings the assembly 30—20 to the open position of Figure 5, when it will begin a leftward movement. Since any movement of the assembly 30—20 to the left, it being then in open position, will set in motion the operation of the compound reel system 105—83—74—77—82, as explained in the preceding paragraph, the ignition circuit 106 of the tractor T eventually will be opened and the tractor stopped. Then the open position (Figure 5) of the assembly 30—20 will be assumed, and the tractor will be stopped, should the assembly leave the furrow to the right. This takes place as follows: the movement of the wheel 30 from the relatively firm soil of the bottom of the furrow into the soft soil of the plowed land provides increased friction of the earth upon the wheel 30, and increases its left-tending power, while the right tending power of the disc 20 is decreased, since the soft plowed ground offers a less firm medium for the disc 20 to work in, than the left bank of the furrow, from which it has recently departed. Thus, the normal balance of the right-tending disc 20 against the left-tending wheel 30 is destroyed, in favor of the wheel 30, and the assembly 30—20 opens, as shown in Figure 5.

When the guide is in a straight furrow, the retractile spring 8 holds the frame 9, which carries the wheel 30, to the left against the anchorage of the disc 20 in the left bank of the furrow, thus preventing the assembly from assuming the open position of Figure 5, and so long as the closed position of Figure 4 is maintained, the assembly tends to keep to the furrow; but when a curve in the furrow is met, the disc 20, losing its anchorage in the left bank, surrenders the anchorage of the assembly to the wheel 30, and then the force of the spring 8 operates directly on the steering mechanism of the tractor, through the drag link 5, and helps the tractor to swing to the left about the curve. In other words, the spring 8 has two functions, one of which is to hold the assembly closed while in a straight furrow, and the other of which is to move the tractor wheels 3 to the left at a curve of the furrow, thereby aiding the wheel 30 to move the guide assembly and the tractor to the left about the curve. Of course, the spring 8 always tends to pull the tractor wheels 3 to the left, as long as the spring has tension, but this force is absorbed in holding the frame 9 against the arm 16 so long as the furrow is straight; but, when the left bank of the furrow recedes, the force is effective in moving the wheels 3 to the left, until the tension of the spring 8 ceases.

The relative positions of the opposing elements (the wheel 30 and the disc 20) change with reference to each other, and with reference to the line of travel of the tractor, when a curve of the furrow is met, because the axle 29 and the arm 16 assume a different angle to the furrow.

Attention is directed to anti-clockwise movement of the wheel 30, at a curve in the furrow, and the added power it gains thereby for leftwardly leading.

Having thus described the invention, what is claimed is:

1. In a tractor guide, or automotive vehicle automatic steering device, a furrow-following assembly embodying a left-tending member and a right-tending member, means for mounting said members for movement to and from open and closed positions transversely of a furrow, thereby to enable them to move toward and away from each other, and to enable them to follow the respective banks of a furrow at a curve, and means for connecting said members to render each of them operative to move the other to and from open and closed position.

2. In a tractor guide, a furrow-following assembly embodying a left-tending member and a right-tending member, means for mounting said members for movement to and from open and closed positions transversely of the furrow, thereby to enable them to move toward and away from each other, and to enable them to follow the respective banks of a furrow at a curve, means for connecting said members to render each of them operative to move the other to and from open and closed positions, and mechanism operated by said members for stopping the motion of the tractor upon a predetermined lapse of time after the tractor had departed from the furrow.

3. A device of the class described, constructed as set forth in claim 2, and further characterized by the fact that said mechanism embodies a guide, a compound reel, means for supporting the reel, means for mounting the guide for changeable relationship of position with reference to the reel, means for operatively connecting the reel to the guide, a flexible element connected to the reel, an electric switch operatively connected to the flexible element, the reel acquiring rotational movement by contact with the earth, when the aforesaid relationship is changed, means for utilizing said movement for actuating said switch after a predetermined lapse of time, and means for restoring said reel to an unwound status upon reversal of said changeable relationship.

4. In an automotive vehicle automatic steering device, a main frame, on which is mounted a crank and an axle (carrying a furrow-engaging member) disposed at an angle to each other and mounted to swing about a substantially vertical axis on the main frame, an auxiliary frame mounted to swing toward and away from the first-specified furrow-engaging member on the main frame and movable toward and away from the first-specified furrow-engaging member, and a link pivoted to the crank and to the auxiliary frame.

5. In an automotive vehicle automatic steering device, a main frame, a crank and an axle disposed at an angle to each other and mounted to swing in a substantially vertical bearing on the main frame, an auxiliary frame mounted to swing toward and away from the main frame, a furrow-engaging member on the axle, a furrow-engaging member on the auxiliary frame and movable therewith toward and away from the first-specified furrow-engaging member, and a link pivoted to the crank and to the auxiliary frame, a stop on the vertical bearing on the main frame and engaging the axle when the furrow-engaging member on the auxiliary frame is in the open position, and a second stop on the vertical bearing on the main frame engaging the axle when the furrow-engaging member on the auxiliary frame is in the closed position.

6. In a tractor guide, or an automotive vehicle automatic steering device, a main frame, a substantially vertical bearing on the main frame, a substantially vertical shaft mounted to rock in the bearing, the shaft being provided with a forwardly extended crank, and with an inwardly extended axle, a furrow-engaging member on the axle, an auxiliary frame mounted to swing toward and away from the main frame, a furrow-engaging member on the auxiliary frame and movable therewith toward and away from the first-specified furrow-engaging member, a link pivoted to the forwardly extended crank and to the auxiliary frame, a device pivotally connected to the main frame and to an adjunct of a furrow-engaging member, in such a way that, under normal travel along a substantially straight furrow, the device remains inactive, but, when the guide leaves the furrow, the device will be set in operation which will short-circuit the ignition system of a tractor or automotive vehicle after a predetermined lapse of time, thereby stopping the motion of same.

7. In a tractor guide, or automotive vehicle automatic steering device a furrow-following assembly embodying a left-tending furrow-engaging member and a right-tending furrow-engaging member, means for mounting said members for movement to and from open and closed positions transversely of a furrow, thereby to enable them to move toward and away from each other, and to enable them to follow the respective banks of a furrow at a curve, means for adjusting said members vertically with respect to each other and with respect to the soil, and means for connecting said members to render each of them operative to move the other to and from open and closed positions.

8. In a device of the class described, a bearing, means for connecting the bearing to the steering mechanism of a tractor, or automotive vehicle, a shaft mounted to rock in the bearing, a hobble carried by the shaft, a frame pivoted to the shaft for swinging movement in a direction substantially parallel to the axis of the shaft, the frame including a lateral extension, spring means connected to the shaft and to the frame for holding the extension yieldably at one end of the hobble, the hobble being adjustable as to length, and a furrow-following means carried by the frame.

9. A device of the class described, constructed as set forth in claim 8, and further characterized by the provision of means for holding the shaft in adjusted positions, in the direction of its length, for rocking movement in the bearing.

10. Steering mechanism for a vehicle, embodying members telescoped for relative sliding movement, a latch engaging said members, to hold them against relative sliding movement, and means for operating the latch from a remote point.

11. In a tractor or automotive vehicle guide, a main frame carrying a left-tending element, a supplementary frame carrying a right-tending element, and pivotally connected to the main frame for lateral movement of the right-tending element toward and away from the left-tending element, said left-tending element capable of a left curve of a furrow, of moving said right-tending element away from the left-tending element, through connecting members, at which time the left-tending element generates progressively increasing force and the right-tending element generates progressively decreasing force, the reverse of these conditions transpiring upon the elements moving from the curve into the regained straight furrow.

12. In a tractor, or automotive vehicle automatic steering device, an arm over the furrow to be followed by the automatic steering device upon its next course about the field, to which arm is attached, universally adjustable, a disc or share, for contact with the soil of the furrow, and moving soil from the bottom of said furrow against a bank of said furrow.

13. In an automatic guide for an automotive machine, means for mounting the guide on said automotive machine, automatically operated mechanical control members on the guide, a compound element pivotally mounted on the guide, for short-circuiting the ignition system of the automotive machine after a predetermined lapse of time, means provided whereby, (when the guide leaves the furrow, or when the guide is making a curve of a furrow) control members may set in motion operation of said compound element, and when the guide is out of the furrow, said compound element remaining in motion until the ignition system of the automotive machine is short-circuited; but, if the guide is making a curve in the furrow, the predetermined lapse of time will not have transpired before said curve shall have been completed, and the guide control members shall have stopped motion in the compound element, and, thereupon, by means provided, a reversed motion shall be set up in said compound element, thereby to restore same to its former status.

In testimony that I claim the foregoing as my own, I have hereto affixed my signature.

MARK B. WILLIAMS.